United States Patent [19]
Warren

[11] Patent Number: 5,446,616
[45] Date of Patent: Aug. 29, 1995

[54] ELECTRODE STRUCTURE AND METHOD FOR ANODICALLY-BONDED CAPACITIVE SENSORS

[75] Inventor: Keith O. Warren, Newbury Park, Calif.

[73] Assignee: Litton Systems, Inc., Beverly Hills, Calif.

[21] Appl. No.: 218,711

[22] Filed: Mar. 28, 1994

[51] Int. Cl.⁶ ............................................. H01G 7/00
[52] U.S. Cl. ................... 361/283.2; 361/278; 73/514.32; 29/25.41; 427/126.2; 156/273.1
[58] Field of Search ............... 361/277, 278, 279, 280, 361/281, 283.1, 283.2, 283.4, 303, 304, 305; 73/514, 517 R, 517 B; 29/25.41; 156/273.1; 174/258, 259; 65/60.2, 60.4; 427/126.2

[56] References Cited

U.S. PATENT DOCUMENTS

| | | | |
|---|---|---|---|
| 3,075,860 | 1/1963 | Veres | 361/309 |
| 4,153,518 | 5/1979 | Holmes et al. | 427/126.2 |
| 5,055,838 | 10/1991 | Wise et al. | 361/283.4 |
| 5,181,156 | 1/1993 | Gutteridge et al. | 73/517 R |
| 5,205,171 | 4/1993 | O'Brien et al. | 73/517 R |
| 5,264,075 | 11/1993 | Zanini-Fisher et al. | 156/633 |

FOREIGN PATENT DOCUMENTS

| | | | |
|---|---|---|---|
| 0459723 | 12/1991 | European Pat. Off. | 73/517 R |
| 4-32773 | 2/1992 | Japan | 361/280 |

OTHER PUBLICATIONS

Bosseboeuf, A., et al., "Lift-off patterning of ion-beam sputter deposited silicon nitride oxidation makes", *J. Vac. Sci. Technol.*, B 9(5), pp. 2526-2529, Sep./Oct. 1991.

Kominiak, G. J., "Silicon Nitride Films by Direct RF Sputter Deposition", *J. Electrochem. Soc.*, vol. 122, No. 9, pp. 1271-1273, Sep. 1975.

Mogab, C. J., et al., "Effect of Reactant Nitrogen Pressure on the Microstructure and Properties of Reactively Sputtered Silicon Nitride Films", *J. Electrochem. Soc.*, vol. 122, No. 6, pp. 815-822, Jun. 1975.

Samuelson, G. M., et al., "The Correlations Between Physical and Electrical Properties of PECVD SiN with Their Composition Ratios", *J. Electrochem. Soc.*, vol. 129, No. 8, pp. 1773-1777, Aug. 1982.

Warren, Keith, "Electrostatically Force-Balanced Silicon Acclerometer", *Journal of the Institute of Navigation*, vol. 38, No. 1, pp. 91-99, Spring 1991.

Primary Examiner—Teresa J. Walberg
Assistant Examiner—Gregory C. Mills
Attorney, Agent, or Firm—Nilsson, Wurst and Green

[57] ABSTRACT

A sensing electrode on a glass layer of an anodically-bonded capacitive sensor has an interfacial barrier film containing a nitride compound between the electrode and the glass layer. In one embodiment, the capacitive sensor is an inertial sensor having a sensing element hingedly mounted to a frame which is anodically bonded to the glass layer. The sensing electrode is then located on a surface of the glass layer facing the sensing element. The sensing element and the frame are preferably made of silicon and the interfacial film is preferably silicon nitride.

22 Claims, 2 Drawing Sheets

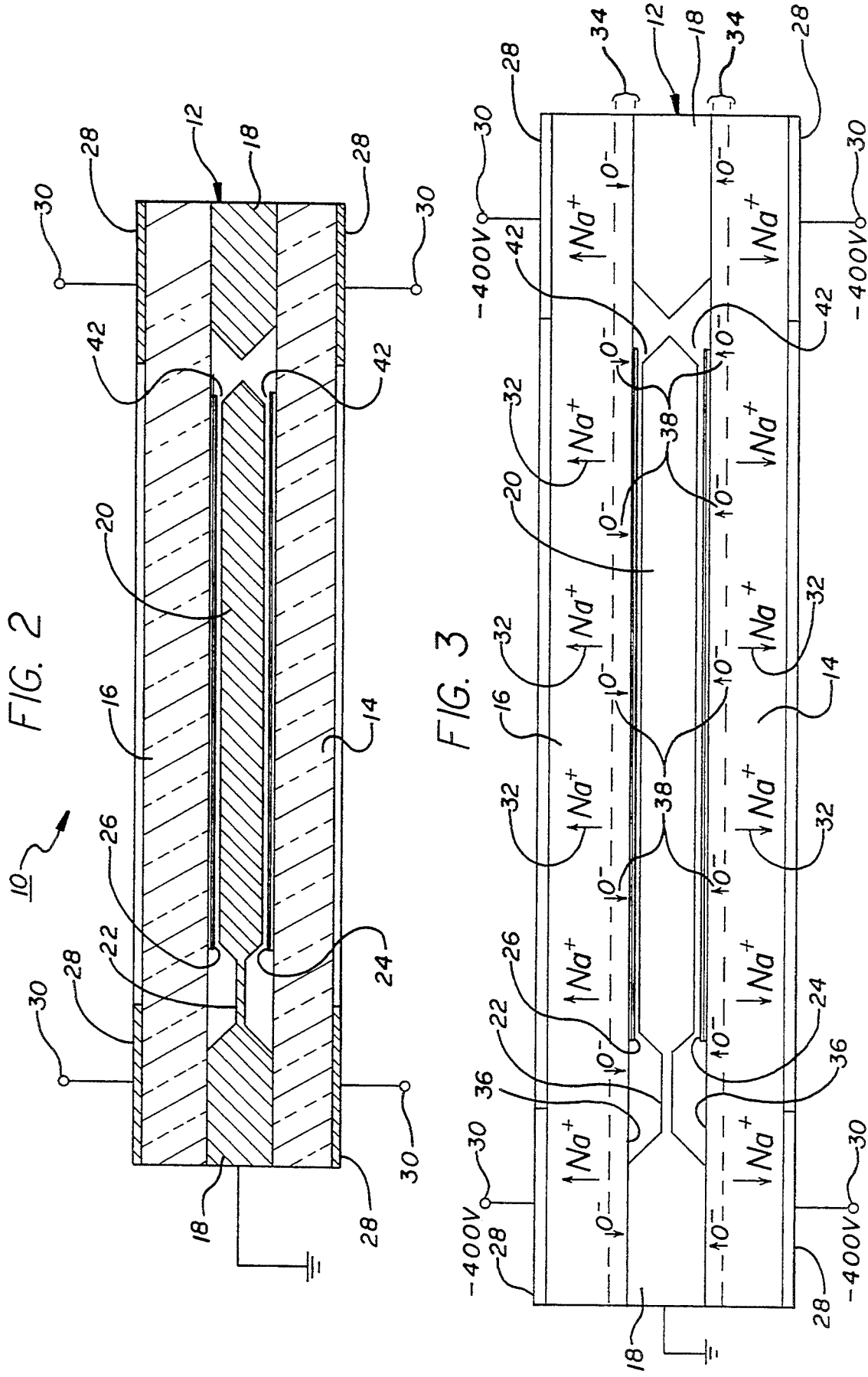

ELECTRODE STRUCTURE AND METHOD FOR ANODICALLY-BONDED CAPACITIVE SENSORS

BACKGROUND OF THE INVENTION

The present invention relates to capacitive sensors and, more particularly, to a sensor in which a frame surrounding a sensing element is anodically bonded to a glass layer having a sensing electrode over a portion of its surface.

Anodic bonding is used to affix and seal glass wafers to adjacent semiconductor layers in a variety of capacitive sensing devices, such as pressure sensors, flow sensors and accelerometers. Anodic bonding occurs between a piece of sodium-containing glass and an adjacent semiconductor when the glass is biased to a large negative potential relative to the semiconductor at temperatures of a few hundred degrees C. This draws sodium ions within the glass away from the glass/semiconductor interface, leaving a thin depletion region. The electric field across the depletion region is so intense that it breaks bridging bonds in the glass and draws the resulting oxygen ions toward the semiconductor. The semiconductor is therefore oxidized near the interface and chemically bonds the semiconductor to the glass.

In capacitive sensors of this type, a portion of the glass layer which is not anodically bonded is coated with a thin film sensing electrode. In order to avoid arcing, this electrode is often maintained at the same potential as the semiconductor body during the bonding process. Thus, a depletion region is formed in the glass adjacent the sensing electrode, as well as adjacent the semiconductor itself, drawing oxygen toward the electrode. Applicant has discovered that this results in at least a portion of the electrode material being oxidized and adversely affects the accuracy and reliability of the finished sensor. In extreme cases, the electrode material is completely consumed by oxidation.

In addition, applicant has found that oxidation continues while the sensor operates because the electrodes are typically maintained at a higher potential than the glass. This gradually draws additional oxygen toward the interface and oxidizes the electrode even further. In an inertial sensor, such as a silicon-on-glass accelerometer, this causes the gap on either side of a movable sensing element to change over time and affects the electrostatic forces required to servo the sensing element back to its null position. Significant errors can be introduced into the output of the device in this way.

Examples of capacitive silicon-on-glass accelerometers susceptible to the foregoing effects are disclosed in: O'Brien et al. U.S. Pat. No. 5,205,171; and Warren, K., *Journal of the Institute of Navigation*, vol. 38, no. 1, pages 91–99, Spring 1991.

Therefore, it is desirable in many applications to provide a structure and a method for eliminating the deleterious effects of anodic bonding in capacitive sensors.

SUMMARY OF THE INVENTION

The present invention incorporates an interfacial barrier layer, such as a nitride film, between a glass wafer and a sensing electrode of an anodically-bonded capacitive sensor to eliminate the migration of oxygen from the glass to the electrode material. When the capacitive sensor is a silicon-on-glass accelerometer, the nitride compound is preferably silicon nitride ($Si_3N_4$) formed by a suitable thin film deposition technique. Such techniques include plasma-enhanced chemical vapor deposition (PECVD) followed by a suitable patterning step and, in a specific embodiment, reactive sputtering of silicon in a nitrogen-containing atmosphere.

Accordingly, the sensor of the present invention may include: a sensing element having a frame structure; at least one glass layer anodically bonded to the frame structure and having a metallic sensing electrode adjacent the sensing element; and an interfacial barrier layer disposed between the glass layer and the metallic sensing electrode. In one embodiment, the device is an inertial sensor, such as an accelerometer, having: a substantially planar proof mass hingedly connected to a frame structure, the proof mass and the frame structure comprising a monolithic silicon body; a pair of glass layers anodically bonded to oppositely-directed surfaces of the frame structure and having a metallic sensing electrode spatially opposed to the proof mass; and an interfacial nitride film between the glass layer and the metallic sensing electrode. A glass layer may be provided on either side of the proof mass and frame, and the interfacial film may comprise silicon nitride.

The structure and method of the present invention are intended to protect the integrity of a sensing electrode during an anodic bonding process without adversely affecting adhesion between the sensing electrode and an associated glass layer. In addition, they are intended to reduce changes in the operating characteristics of an anodically-bonded capacitive sensor during its useful life and to eliminate failures of anodic bonds in capacitive sensors.

BRIEF DESCRIPTION OF THE DRAWINGS

The above and other features of the present invention may be more fully understood from the following detailed description, taken together with the accompanying drawings, wherein similar reference characters refer to similar elements throughout and in which:

FIG. 2 is a somewhat schematic horizontal sectional view of the capacitive sensor of FIG. 1 taken along the line 2—2;

FIG. 3 is a schematic representation of the capacitive sensor of FIG. 2 showing the depletion region formed during anodic bonding and the movement of ions within the glass under the influence of a bonding potential;

DESCRIPTION OF THE PREFERRED EMBODIMENTS

Figure 1:
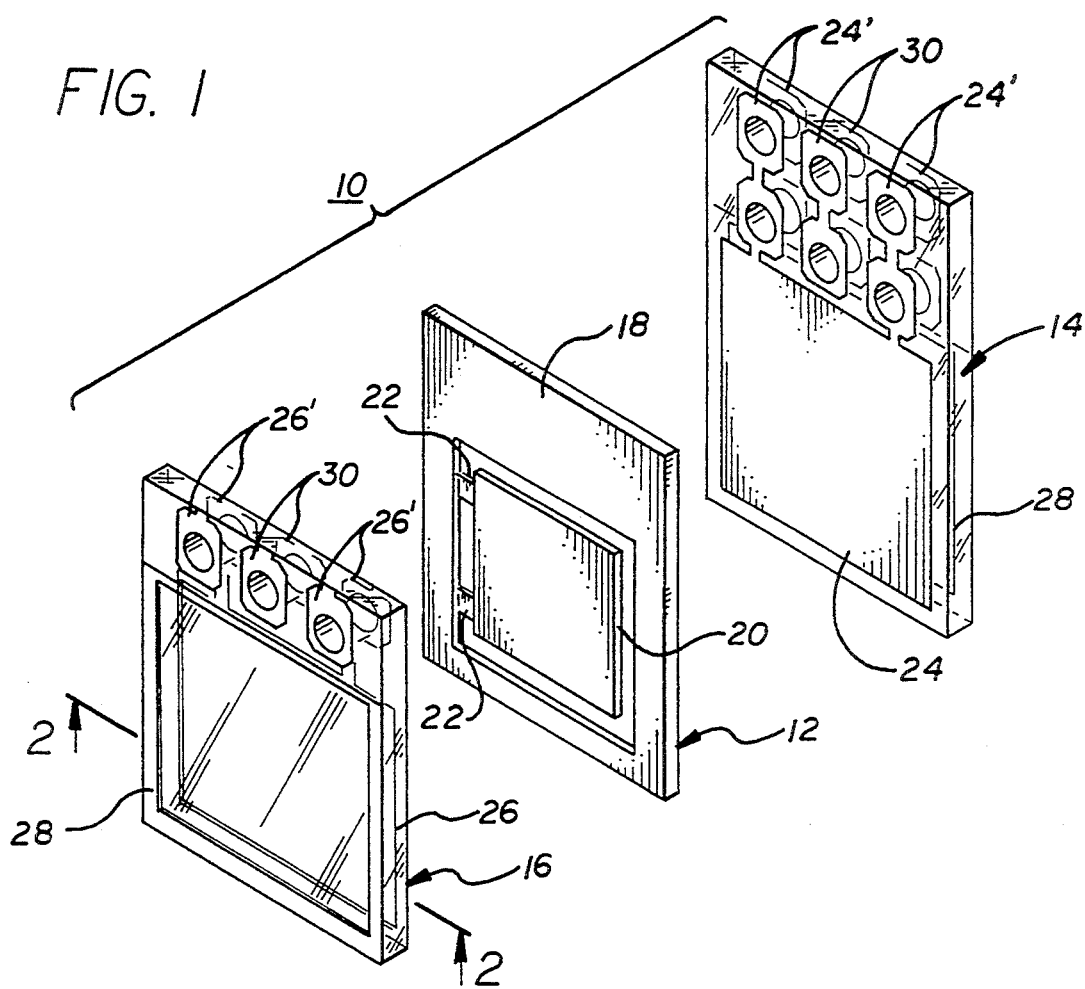
FIG. 1 is an exploded perspective view of a capacitive sensor constructed according to a preferred embodiment of the present invention.

Referring now to FIG. 1, which illustrates a preferred embodiment of the present invention, a capacitive sensor 10 is made up of a semiconductor body 12 sandwiched between a glass base layer 14 and a glass top layer 16. The semiconductor body 12 has a peripheral frame portion 18 anodically bonded to each of the base layer 14 and the top layer 16, and a central sensing element 20 connected to the frame portion 18 through flexures or "hinges" 22. The base layer 14 and the top layer 16 are provided with sensing electrodes 24 and 26, respectively, on surfaces facing the sensing element 20, to detect movement of the sensing element under the influence of external forces. When the capacitive sensor 20 is an accelerometer or other inertial sensor, the sensing electrodes 24 and 26 are also used to apply electrostatic forces sufficient to return the sensing element to its neutral position. The sensing element 20 thus serves as a force-balanced proof mass supported for hinged movement within a free space between the electrodes 24 and 26. Electrical connection is made to the sensing electrodes 24 and 26 through contact pads 24' and 26', respectively. Accelerometers of this type are described in O'Brien et al. U.S. Pat. No. 5,205,171 and Warren, K., *Journal of the Institute of Navigation*, vol. 38, no. 1, pages 91–99, Spring 1991, the disclosures of which are hereby incorporated by reference for all purposes.

Figure 4A:
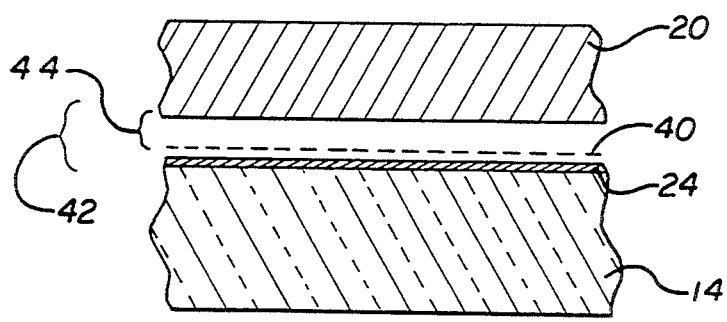
FIG. 4A is an enlarged fragmentary sectional view corresponding to a portion of the capacitive sensor of FIG. 2, illustrating an electrode configuration of the prior art.
Figure 4B:
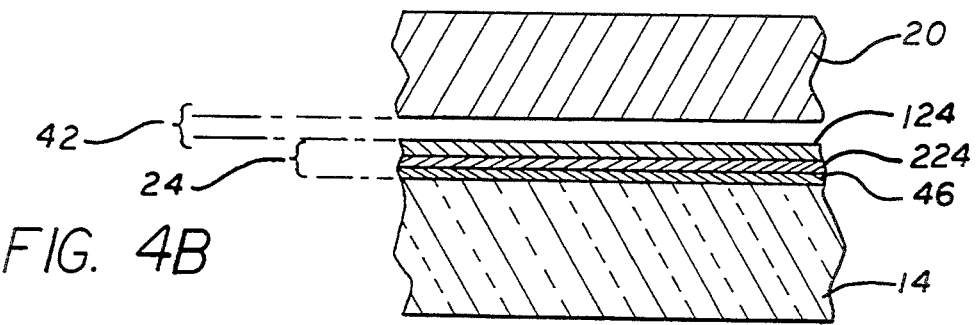
FIG. 4B is an enlarged fragmentary view of a portion of the capacitive sensor of FIG. 2 showing an interfacial barrier layer constructed according to a preferred embodiment of the invention.

In accordance with the present invention, an interfacial barrier layer 46, shown specifically in FIG. 4B, is disposed between the sensing electrodes 24 and 26 and the respective glass layers 14 and 16. This interfacial layer acts as a barrier to migration of oxygen from the glass layers and thereby prevents oxidation of the electrode material during fabrication and operation of the sensor.

Although for convenience the present invention is described with respect to an inertial sensor, and specifically a silicon-on-glass accelerometer, the teachings apply equally well to other forms of capacitive sensors in which glass layers are anodically bonded to a structure containing a sensing element. Such sensors include pressure sensors and flow sensors in which a diaphragm is acted on by a fluid being measured. They have a structure corresponding to the semiconductor body 12, except that the sensing element 20 is replaced by a diaphragm. This diaphragm is deflected under the influence of fluid pressure or flow conditions, and the deflection is measured by sensing electrodes.

With reference to FIG. 2, the capacitive sensor 10 has bonding electrodes 28 at the periphery of outwardly-directed surfaces of the glass base layer 14 and the glass top layer 16 for applying the electrical potential required for anodic bonding. This potential is applied through bonding terminals 30 (see also FIG. 2), with the semiconductor body 12 being grounded.

Referring now to FIG. 3, in the bonding process a potential of −400 volts is applied to the terminals 30 while the device is maintained at a temperature of approximately 300 degrees C. This draws positively-charged sodium ions 32 within the glass toward the bonding electrodes 28 and away from the peripheral frame portion 18 of the semiconductor body 12. Because the sensing electrodes 24 and 26 are maintained at the same potential as the semiconductor body 12, sodium atoms are drawn uniformly downwardly within the glass base layer 14 and upwardly within the glass top layer 16, thereby depleting free positive charge carriers from the innermost surfaces of the two glass layers. Thus, the bonding potential establishes a thin depletion region 34 adjacent the inwardly-directed surfaces 36 of the glass layers 14 and 16. In this configuration, most of the applied potential is felt across the depletion region due to its high resistivity. The depletion region is thin (approximately one micron) and the resulting field is quite intense. As a result, bridging oxygen atoms in the silica network of the glass are drawn toward the glass/silicon interface in the form of negatively-charged ions designated 38 in FIG. 3. These ions oxidize the silicon atoms at the interface to chemically connect the silicon and the glass.

The sensing electrodes 24 and 26 are maintained at the same potential as the semiconductor body 12 during the anodic bonding process in order to avoid arcing and possible sticking of the sensing element 20 to the electrode metal. This causes oxygen ions to migrate toward the electrodes, as well, resulting in anodic oxidation of the electrode material. In extreme cases, the electrode material is completely consumed by oxidation, causing a loss of adhesion to the glass. In every case, at least some of the electrode is consumed if a barrier layer is not provided in accordance with the present invention.

An additional result of oxidizing the material of the sensing electrodes 24 and 26 is illustrated schematically in FIG. 4A, wherein the thickness of the sensing electrode 24 is increased in thickness so it encroaches upon the capacitive gap of the device to the extent indicated at 40 in FIG. 4A. Due to the extremely small distances between the various elements, this causes a significant reduction in the operative gap from an initial value 42 to a subsequent value 44. Even if failure of the device does not occur from loss of adhesion, a reduction in the gap between the sensing element and the electrodes seriously affects the accuracy of the device.

Oxidation also continues at a slower rate during normal operation of the sensing device 10 when a barrier layer is not used. This occurs because the electrodes are typically more positive in potential than the sensing element. At operating temperatures of approximately 85 degrees C and above, the potential is capable of drawing negatively charged oxygen ions from the glass toward the electrode, further reducing the capacitive gap of the device.

Referring now to FIG. 4B, the interfacial barrier layer 46 is provided according to the present invention between each of the sensing electrodes and the corresponding glass layer 14 or 16. In a preferred embodiment, the electrodes 24 and 26 are formed of a gold conduction layer deposited over a titanium adhesion layer. Specifically, the sensing electrode 24 of FIG. 4B is made up of a gold conduction layer 124 deposited over a titanium adhesion layer 224. The sensing electrode 26, which is not shown separately in detail, is then the mirror image of the sensing electrode 24. The barrier layer 46 is preferably a nitride compound, and most preferably silicon nitride. The barrier layer 46 is preferably at least a few hundred angstroms thick, and most preferably between 800 and 1000 angstroms thick, and may be formed by any suitable thin film process including, for example, plasma-enhanced chemical vapor deposition (PECVD) or reactive sputtering. Of these processes, reactive sputtering is preferable, particularly when an ion beam is used, because it is carried out at low temperatures and is relatively directional.

With respect to materials of construction, the base layer 14 and the top layer 16 may be any sodium-containing glass suitable for anodic bonding. Glasses having appropriate sodium contents include, by way of example, glass manufactured by Corning under the trademark "Pyrex", that manufactured by the Schott Glass Company under the mark "Tempax", and comparable glass manufactured by the Hoya Glass Company. The semiconductor body 12 can then be any suitable crystalline semiconductor, such as single crystal silicon, formed by anisotropic etching of a silicon wafer. The etching process, which is well-known in the art, is used to form the sensing element 20 and the flexures 22 in the configuration shown in FIGS. 1 and 2. Alternatively, the body 12 can be made of any other suitable semiconductor material which has appropriate elastic properties and is capable of being etched or otherwise configured in the required manner. One example of such a material is germanium.

The glass layers 14 and 16 are preferably approximately 500 microns thick and the semiconductor 12 is preferably approximately 300 microns thick at the peripheral frame portion 18. The sensing element 20 is then reduced in thickness by etching to provide gaps 42 approximately 3 microns across with the sensing electrodes in place. Each of the sensing electrodes 24 and 26 is preferably approximately 2500 angstroms thick, which in the embodiment of FIG. 4B is a composite film made up of a titanium adhesion layer (such as the layer 224) approximately 200 angstroms of titanium adjacent the barrier layer 46 and a gold conduction layer (such as the layer 124) approximately 2300 angstroms thick. These metals are preferably deposited sequentially without breaking vacuum according to a suitable thin film technique, such as sputtering. As described above, the interfacial barrier layers 46 (see FIG. 4B) between the glass layers and the corresponding sensing electrodes add from a few hundred angstroms to approximately 1000 angstroms to the overall thickness of the electrode structure. These thicknesses are accommodated in the structure of the FIGS. 1 and 2, however, to yield a capacitive gap of approximately 3 microns on either side of the sensing element 20.

Although the barrier layer 14 is preferably silicon nitride, other materials can be used in place of silicon nitride as long as they bond well to the glass layers 14 and 16 and provide adequate adhesion to the metals of the electrodes 24 and 26. One such material is titanium nitride.

In fabricating the capacitive sensor 10, and particularly the interfacial barrier layer 46, it is important to minimize any adverse effects on the glass base layer 14 and the glass top layer 16 from exposure to heat or chemicals during the deposition and patterning steps. One process for depositing the barrier layer 46 is plasma-enhanced chemical vapor deposition (PECVD), in which a silicon nitride layer is deposited from a plasma containing dichlorosilane and ammonia at a temperature of approximately 385° C. Glass wafers coated in this way show some tendency to warp during processing, but are generally acceptable. They are then patterned by an etching process to remove silicon nitride from all areas other than those on which the sensing electrodes 24 and 26 are to be formed. In actual practice, the layer of silicon nitride is typically provided over an area slightly larger than the subsequent electrode metallization in order to avoid direct contact between the electrode metal and the glass. Although the plasma-enhanced chemical vapor deposition process results in usable devices which do not exhibit the migration/oxidation problems of the prior art, it can undesirably roughen the glass in the region of the anodic bond and leach some of the sodium from the areas etched. Both of these effects render subsequent anodic bonding more difficult.

A preferred method of depositing the barrier layer 46, and particularly a barrier layer of silicon nitride, is reactive sputtering. In the process, an ion gun is used to sputter a silicon target in a nitrogen-containing atmosphere. The gun preferably emits either nitrogen or argon ions and the substrate may be heated to approximately 70 degrees C. The process is therefore a low temperature process which does not adversely affect the glass wafers and is relatively directional. The barrier layer 46 can therefore be patterned either by a conventional "lift-off" photoresist process or by depositing the barrier layer through a shadow mask, eliminating the need to etch or otherwise disturb the glass surface in the region of the anodic bond. Either of these patterning methods leaves an entirely undamaged surface for use in the subsequent bonding step. The atoms of silicon nitride deposited by reactive sputtering are also more densely packed than when deposited by plasma-enhanced chemical vapor deposition. This results from both the higher energy of the sputtered atoms and the absence of hydrogen from the deposition environment.

While the preferred embodiment has been described and illustrated, various substitutions and modifications may be made thereto without departing from the scope of the invention. Accordingly, the present invention has been described by way of illustration and not limitation.

What is claimed is:

1. An anodically-bonded capacitive sensor comprising:
    a sensing element having a frame structure;
    at least one glass layer anodically bonded to the frame structure and having a metallic sensing electrode adjacent the sensing element; and
    a patterned interfacial barrier layer on the glass layer, said pattered interfacial barrier layer disposed between the glass layer and the metallic sensing electrode.

2. The anodically-bonded capacitive sensor of claim 1 wherein:
    said patterned interfacial barrier layer contains a nitride compound.

3. The anodically-bonded capacitive sensor of claim 1 wherein:
    said interfacial barrier layer comprises a film of silicon nitride.

4. The anodically-bonded capacitive sensor of claim 3 wherein:
    the metallic sensing electrode contains titanium.

5. The anodically-bonded capacitive sensor of claim 3 wherein:
    the metallic sensing electrode is a multilayer structure in which a layer of conductive material is deposited over a titanium-containing layer.

6. The anodically-bonded capacitive sensor of claim 1 wherein:
    said patterned interfacial barrier layer comprises silicon nitride formed by sputtering silicon in an atmosphere containing nitrogen.

7. The anodically-bonded capacitive sensor of claim 6 wherein:
    said patterned interfacial barrier layer is deposited using an ion gun.

8. The anodically-bonded capacitive sensor of claim 1 wherein:
    the sensing element and the frame structure comprise a semiconductor material.

9. The anodically-bonded capacitive sensor of claim 1 wherein:
    the sensing element and the frame structure comprise silicon.

10. The anodically-bonded capacitive sensor of claim 1 wherein:

the sensing element and the frame structure comprise a monolithic silicon body.

11. The anodically-bonded capacitive sensor of claim 1 wherein:
said at least one glass layer comprises a separate glass layer on each side of the sensing element and frame structure.

12. An anodically-bonded capacitive sensor comprising:
a substantially planar sensing element and frame structure made up of a semiconductor material;
a pair of glass layers anodically bonded to oppositely-directed surfaces of the frame structure, each of said glass layers having a metallic sensing electrode spatially opposed to the sensing element; and
a patterned interfacial barrier layer containing a nitride compound on each of the glass layers, each of said one of the glass layers and its metallic sensing electrode.

13. An anodically-bonded inertial sensor comprising:
a substantially planar proof mass hingedly connected to a frame structure, the proof mass and the frame structure comprising a monolithic silicon body;
a pair of glass layers anodically bonded to oppositely-directed surfaces of the frame structure, each of said glass layers having a metallic sensing electrode spatially opposed to the proof mass; and
a patterned interfacial nitride film on each of the glass layers, each of said patterned interfacial nitride films being disposed between one of the glass layers and its metallic sensing electrode.

14. A method of manufacturing a capacitive sensor comprising the steps of:
providing a sensing element connected to a frame structure;
providing at least one glass sheet having a preselected area corresponding to the sensing element;
forming a patterned barrier layer on the preselected area of the glass sheet;
depositing a metallic sensing electrode on said patterned barrier layer; and
anodically bonding the glass layer to the frame structure so that the metallic sensing electrode spatially opposes the sensing element.

15. The manufacturing method of claim 14 wherein:
the sensing element and the frame structure comprise a semiconductor.

16. The manufacturing method of claim 14 wherein:
the sensing element and the frame structure comprise silicon.

17. The manufacturing method of claim 15 wherein:
the barrier layer consists essentially of silicon nitride.

18. The manufacturing method of claim 17 wherein:
the barrier layer is formed by sputtering silicon in an atmosphere containing nitrogen.

19. The manufacturing method of claim 18 wherein:
the silicon is sputtered using an ion gun.

20. The manufacturing method of claim 19 wherein:
the barrier layer is deposited through a shadow mask.

21. The manufacturing method of claim 19 wherein:
the barrier layer is patterned by a lift-off photoresist process.

22. A method of manufacturing an inertial sensor comprising the steps of:
providing a proof mass connected to a frame structure;
providing at least one glass sheet having a preselected area corresponding to the proof mass;
forming a patterned nitride layer on the preselected area of the glass sheet;
depositing a metallic sensing electrode on said patterned nitride layer; and
anodically bonding the glass layer to the frame structure so that the metallic sensing electrode spatially opposes the proof mass.

* * * * *